United States Patent
Henry et al.

(10) Patent No.: US 11,882,185 B1
(45) Date of Patent: Jan. 23, 2024

(54) MAINTAINING QUALITY COMMUNICATION FOR INTEGRATED CHANNELS IN TRANSACTION SYSTEMS

(71) Applicant: Truist Bank, Charlotte, NC (US)

(72) Inventors: Kendra Henry, Charlotte, NC (US); Pramod Nambiar, Tega Cay, SC (US); Luana Peterman, Lancaster, SC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/129,152

(22) Filed: Mar. 31, 2023

(51) Int. Cl.
*H04L 67/12* (2022.01)
*H04L 69/18* (2022.01)

(52) U.S. Cl.
CPC .............. *H04L 67/12* (2013.01); *H04L 69/18* (2013.01)

(58) Field of Classification Search
CPC ................................. H04L 67/12; H04L 69/18
See application file for complete search history.

(56) References Cited

U.S. PATENT DOCUMENTS

| | | | | |
|---|---|---|---|---|
| 7,783,613 | B2* | 8/2010 | Gupta | H04L 67/5651 707/693 |
| 2010/0125470 | A1* | 5/2010 | Chisholm | G06Q 20/40 705/35 |
| 2015/0112870 | A1* | 4/2015 | Nagasundaram | G06Q 20/385 705/67 |
| 2015/0248696 | A1* | 9/2015 | Fernandez | G06Q 30/0268 705/14.51 |
| 2019/0287082 | A1* | 9/2019 | Song | G06Q 20/405 |
| 2022/0083369 | A1* | 3/2022 | Snyder | G06F 9/467 |
| 2022/0350815 | A1* | 11/2022 | Bauskar | G06F 3/061 |
| 2022/0366494 | A1* | 11/2022 | Cella | H04L 9/50 |
| 2023/0214792 | A1* | 7/2023 | Lee | G06Q 20/02 705/75 |
| 2023/0306415 | A1* | 9/2023 | Polasa | G06Q 20/227 705/44 |

OTHER PUBLICATIONS

Dachyar, "The Improvement of Online Transaction Return Process, by using Business Process Reengineering Approach: Case study of a State_owned Bank", Jun. 2020.*
Sadgali et al, "Fraud detection in credit card transaction using neural networks", Oct. 2, 2019.*

* cited by examiner

*Primary Examiner* — Todd L Barker
(74) *Attorney, Agent, or Firm* — KilpatrickTownsend & Stockton LLP; Michael A. Springs, Esq.

(57) ABSTRACT

Quality communication can be maintained for integrated channels in transaction systems. For example, a system can receive, by a transaction management layer, a transaction request from a transaction channel of a plurality of transaction channels, the transaction request being in a channel-specific format associated with the transaction channel. The system can, in response to a downstream transaction processing system processing the transaction request, receive a status indicator of the processing of the transaction request. The system can transform the status indicator into the channel-specific format associated with the transaction channel. The system can send the status indicator in the channel-specific format to the transaction channel. The transaction channel can be configured to perform an action in response to receiving the status indicator.

17 Claims, 3 Drawing Sheets

MAINTAINING QUALITY COMMUNICATION FOR INTEGRATED CHANNELS IN TRANSACTION SYSTEMS

TECHNICAL FIELD

The present disclosure relates generally to transaction systems, and more particularly, although not exclusively, to maintaining quality communication for integrated channels in transaction systems.

BACKGROUND

Transaction requests may originate at a transaction channel and be executed by a downstream processing system, which can provide a confirmation or acknowledgement of the execution back to the transaction channel. The confirmation or acknowledgement may need to be directed from the downstream processing system to the transaction channel via various intermediate components. The downstream processing system may generate the confirmation or acknowledgement in a particular format that is different than a format that the transaction channel is capable of processing. Thus, it may be advantageous to streamline the conversion from the downstream processing format to the channel format.

SUMMARY

According to one example of the present disclosure, a system can include a processor and a memory including instructions that are executable by the processor to perform operations. The operations can include receiving, by a transaction management layer, a transaction request from a transaction channel of multiple transaction channels. The transaction request can be in a channel-specific format associated with the transaction channel. In response to a downstream transaction processing system processing the transaction request, the operations can involve receiving a status indicator of the processing of the transaction request and transforming the status indicator into the channel-specific format associated with the transaction channel. The operations can further involve sending the status indicator in the channel-specific format to the transaction channel. The transaction channel can be configured to perform an action in response to receiving the status indicator.

According to another example of the present disclosure, a non-transitory computer readable medium may contain instructions that are executable by a processor to cause the processor to perform operations. The operations can include receiving, by a transaction management layer, a transaction request from a transaction channel of multiple transaction channels. The transaction request can be in a channel-specific format associated with the transaction channel. In response to a downstream transaction processing system processing the transaction request, the operations can involve receiving a status indicator of the processing of the transaction request and transforming the status indicator into the channel-specific format associated with the transaction channel. The operations can further involve sending the status indicator in the channel-specific format to the transaction channel. The transaction channel can be configured to perform an action in response to receiving the status indicator.

According to a further example of the present disclosure, a method involves receiving, by a transaction management layer, a transaction request from a transaction channel of multiple transaction channels. The transaction request can be in a channel-specific format associated with the transaction channel. In response to a downstream transaction processing system processing the transaction request, the method can involve receiving a status indicator of the processing of the transaction request and transforming the status indicator into the channel-specific format associated with the transaction channel. The method can further involve sending the status indicator in the channel-specific format to the transaction channel. The transaction channel can be configured to perform an action in response to receiving the status indicator.

DETAILED DESCRIPTION

Figure 1:
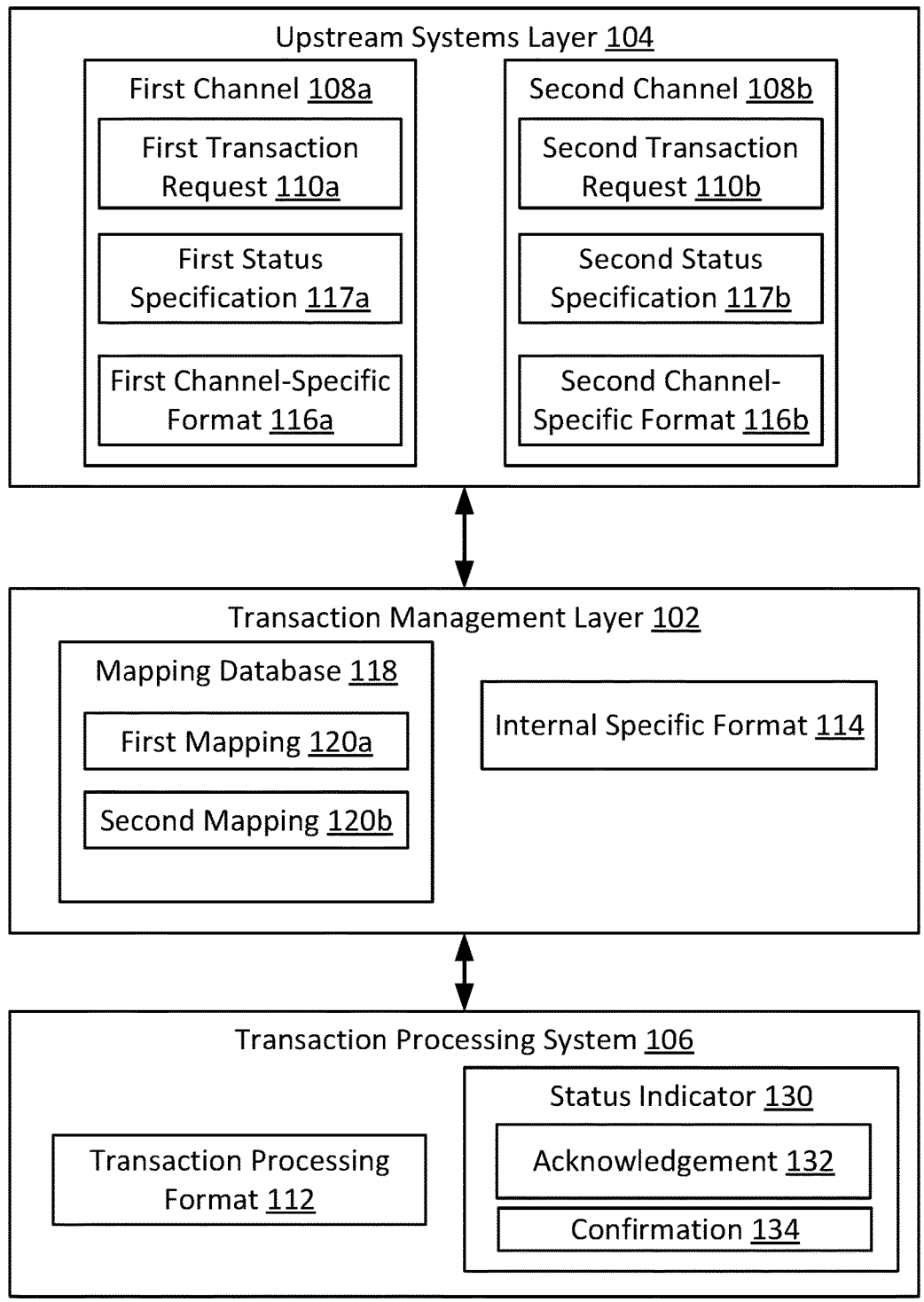
FIG. 1 is a schematic block diagram of an example of a system for implementing maintaining quality communication for integrated channels in a transaction system according to an example of the present disclosure.

A transaction processing system can receive transaction requests to execute transactions. The transaction processing system can process the transaction request by performing actions to fulfill the transaction request. Once executed, the transaction processing system may send a communication (e.g., an acknowledgement or a confirmation) of the execution to a transaction channel that requested the transaction. Conventionally, due to different channel-specific formats associated with each transaction channel, the transaction processing system may rely on additional software applications to convert the communication to the different channel-specific formats. So, transforming the communication to the channel-specific formats is often time-consuming or resource intensive.

Aspects of the present disclosure provide a system that automatically transforms a transaction processing format of a transaction processing system to a channel-specific format of a transaction channel through using an internal specific format. The internal specific format can be a format used by a transaction management layer of the transaction processing system. The transaction management layer can receive a status indicator of the processing of a transaction request from the transaction processing system. In response to receiving the status indicator, the transaction management layer can access a database storing one or more mappings used to transform the transaction processing format to the internal specific format. From the internal specific format, the transaction management layer can transform the status indicator into the channel-specific format. Since the transaction channels may each use a different channel-specific format, the database can store a respective mapping to transform the internal specific format to each different channel-specific format. As a result, the transaction channel can process the status indicator as received from the transaction management layer.

Thus, an advantage of the system of the present disclosure is that the transaction management layer can automatically transform the status indicator from the transaction processing format to the channel-specific format. Using the internal specific format as an intermediate format between the transaction processing format and the channel-specific format enables flexibility associated with format processing for the status indicator. By accessing the database for the mappings, the transaction management layer can transform the status indicator without user input. In addition, the system can transform the status indicator without creating or using a new application to manage the format processing, thereby conserving computing resources.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

FIG. 1 is a schematic block diagram of an example of a system 100 for implementing maintaining quality communication for integrated channels in a transaction system according to an example of the present disclosure. The system 100 can include a transaction management layer 102 communicatively coupled to an upstream systems layer 104 and a transaction processing system 106. The upstream systems layer 104 may include channels 108a-b, which can be transaction channels through which users can transmit transaction requests 110 for subsequent processing. Examples of the channels 108a-b can include Loan IQ, Wire Payment Initiation, etc. In some examples, the transaction requests 110 can be wire payment requests.

The transaction management layer 102 can receive network-transmitted transaction requests 110a-b from the channels 108a-b. The transaction management layer 102 may perform various functions, such as but not limited to, integrating the channels 108a-b into an environment with various components and forwarding the transaction requests 110a-b to the transaction processing system 106.

In some examples, each of the channels 108a-b may have an associated channel-specific format. The channels 108a-b may generate transaction requests 110a-b and process status indicators (e.g., acknowledgements and confirmations) in the respective channel-specific formats. That is, the first channel-specific format 116a of first channel 108a may be different than the second channel-specific format 116b of the second channel 108b. In an example, the first channel-specific format 116a may be a comma-separated values (CSV) file and the second channel-specific format 116b of the second channel 108b may be a messaging queue (MQ) message. The channel-specific format of other channels may be an extensible markup language (XML) file. The information included in a transaction request 110 can include an identifier of a debtor, an identifier of a creditor, an amount of the transaction, a currency, etc.

In addition, each of the channels 108a-b may have an associated status specification 117 that identifies the confirmations or acknowledgements the channels 108a-b are to receive in response to transaction requests. For instance, the first status specification 117a for the first channel 108a may indicate that the first channel 108a is to receive a confirmation of the processing for every transaction request sent by the first channel 108a. Alternatively, the second status specification 117b for the second channel 108b may indicate that the second channel 108b is to receive a confirmation of the processing only for transaction requests over a certain amount (e.g., one-thousand dollars) sent by the second channel 108b. Other specifications may include receiving confirmations or acknowledgements based on the debtor, the creditor, the currency, the status itself (e.g., only receive a status indicator if the processing of the transaction request fails), etc.

Upon receiving the first transaction request 110a in the first channel-specific format 116a from the first channel 108a, the transaction management layer 102 can transform the first transaction request 110a into an internal specific format 114 associated with the transaction management layer 102. The transaction management layer 102 can then transform the first transaction request 110a into a transaction processing formation 112 that the transaction processing system 106 is able to process. Once the first transaction request 110a is in the transaction processing format 112, the transaction management layer 102 can send the first transaction request 110a to the transaction processing system 106 positioned downstream from the transaction management layer 102. The transaction processing system 106 may be referred to herein as a downstream transaction processing system.

In some examples, the transaction management layer 102 may receive a status indicator 130 (e.g., an acknowledgement 132 or a confirmation 134) of an execution of the first transaction request 110a from the transaction processing system 106. The status indicator 130 may be meant to inform the first channel 108a of the processing of the first transaction request 110a. The transaction processing system 106 can generate the status indicator 130 based on determining that the first transaction request 110a is from the first channel 108a and that the first channel 108a is associated with the first status specification 117a indicating that a confirmation is to be sent for each transaction request. The first channel 108a may be incapable of processing the status indicator 130 as generated in the transaction processing format 112. Instead, the first channel 108a may process the status indicator 130 received in the first channel-specific format 116a from the transaction management layer 102.

The transaction management layer 102 can receive the status indicator 130 in the transaction processing format 112. The transaction management layer 102 can transform the status indicator 130 from the transaction processing format 112 into the first channel-specific format 116a indicative of the corresponding transaction channel (e.g., the first channel 108a) that generated the first transaction request 110a. The transaction management layer 102 then can send the status indicator 130 in the first channel-specific format 116a to the first channel 108a.

Specifically, the transaction management layer 102 can process the status indicator 130 in an internal specific format 114 that may be different from the transaction processing format 112 and each of the channel-specific formats 116. So, upon receiving the status indicator 130 from the transaction processing system 106 in the transaction processing format 112, the transaction management layer 102 can access a mapping database 118 to determine a mapping 120 from the transaction processing format 112 to the first channel-specific format 116a.

Once the transaction management layer 102 accesses the mapping 120, the transaction management layer 102 can transform the status indicator 130 from the transaction processing format 112 into the internal specific format 114 based on the mapping 120. The transaction management layer 102 may first determine that the status indicator 130 is associated with the first channel 108a. For instance, the status indicator 130 may include the status of the processing (e.g., completed, failed, delayed, etc.) of the first transaction request 110a along with an indication of the first channel 108a that generated the first transaction request 110a. Based on the status indicator 130 indicating the first channel 108a, the transaction management layer 102 can transform the status indicator 130 into the first channel-specific format 116a.

The transaction management layer 102 can use a first mapping 120a to convert the status indicator 130 from the transaction processing format 112 into the internal specific format 114. The transaction management layer 102 additionally can access the mapping database 118 to determine a second mapping 120b to transform the status indicator 130 from the internal specific format 114 to the first channel-specific format 116a of the first channel 108a. The mapping database 118 can store a respective mapping from the internal specific format 114 into each channel-specific format 116. When a new channel is integrated into the upstream systems layer 104, a new mapping from the internal specific format 114 to a corresponding channel-specific format for the new channel can be generated and stored in the mapping database 118. This process can prevent allocating resources to create or use an additional software application in the system 100 to manage format processing for the status indicator 130, thereby reducing overall computing resources consumed by the system 100.

In some examples, upon transforming the status indicator 130 into the first channel-specific format 116a, the transaction management layer 102 can send the status indicator 130 to the first channel 108a. The first channel 108a may perform an action in response to receiving the status indicator 130. For instance, if the status indicator 130 indicates the first transaction request 110a was processed successfully, the first channel 108a may send a subsequent transaction request to the transaction management layer 102. Alternatively, if the status indicator 130 indicates that the first transaction request 110a was processed unsuccessfully, the first channel 108a may resend the first transaction request 110a, may determine a cause of the failure and mitigate the issue, or may perform another suitable action. Accordingly, since the transaction management layer 102 can handle the transformation of the status indicator 130 into the first channel-specific format 116a, processing failures may be detected and fixed quickly and with limited computing resources.

Figure 2:
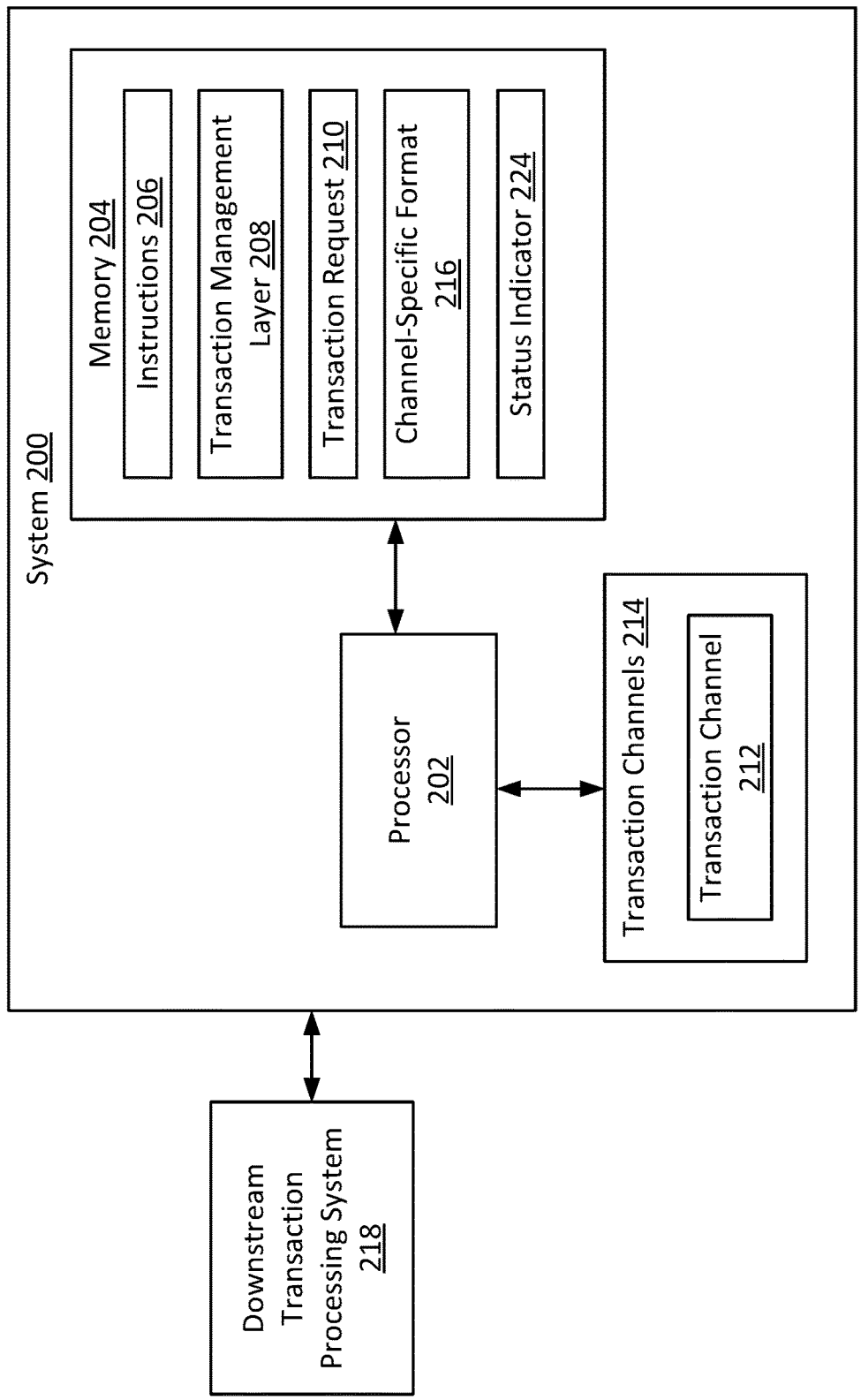
FIG. 2 is a block diagram of another example of a system for implementing maintaining quality communication for integrated channels in a transaction system according to an example of the present disclosure.

FIG. 2 is a block diagram of another example of a system for implementing maintaining quality communication for integrated channels in a transaction system according to an example of the present disclosure. As depicted, the system 200 may include a processor 202 communicatively coupled to a memory 204. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions 206 stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can be a non-transitory, computer-readable medium from which the processor 202 can read the instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 202 can read the instructions 206.

The processor 202 can execute the instructions 206 to perform operations. For example, the processor 202 can receive, by a transaction management layer 208, a transaction request 210 from a transaction channel 212 of multiple transaction channels 214. The transaction request 210 can be in a channel-specific format 216 associated with the transaction channel 212. Other transaction channels of the transaction channels 214 may have a different channel-specific format than the channel-specific format 216 of the transaction channel 212. In response to a downstream transaction processing system 218 processing the transaction request 210, the processor 202 can receive a status indicator 224 of the processing of the transaction request 210. The status indicator 224 may be a confirmation or an acknowledgement of the processing of the transaction request 210. The status indicator 224 can be generated based on a status specification of the transaction channel 212. The processor 202 can transform the status indicator 224 into the channel-specific format 216 associated with the transaction channel 212. The processor 202 may access a first mapping to transform the status indicator 224 from a transaction processing format of the downstream transaction processing system 218 to an internal specific format of the transaction management layer 208. The processor 202 may also access a second mapping to transform the status indicator from the internal specific format to the channel-specific format 216 of the transaction channel 212. The processor 202 can send the status indicator 224 in the channel-specific format 216 to the transaction channel 212. The transaction channel 212 can perform an action in response to receiving the status indicator 224.

Figure 3:
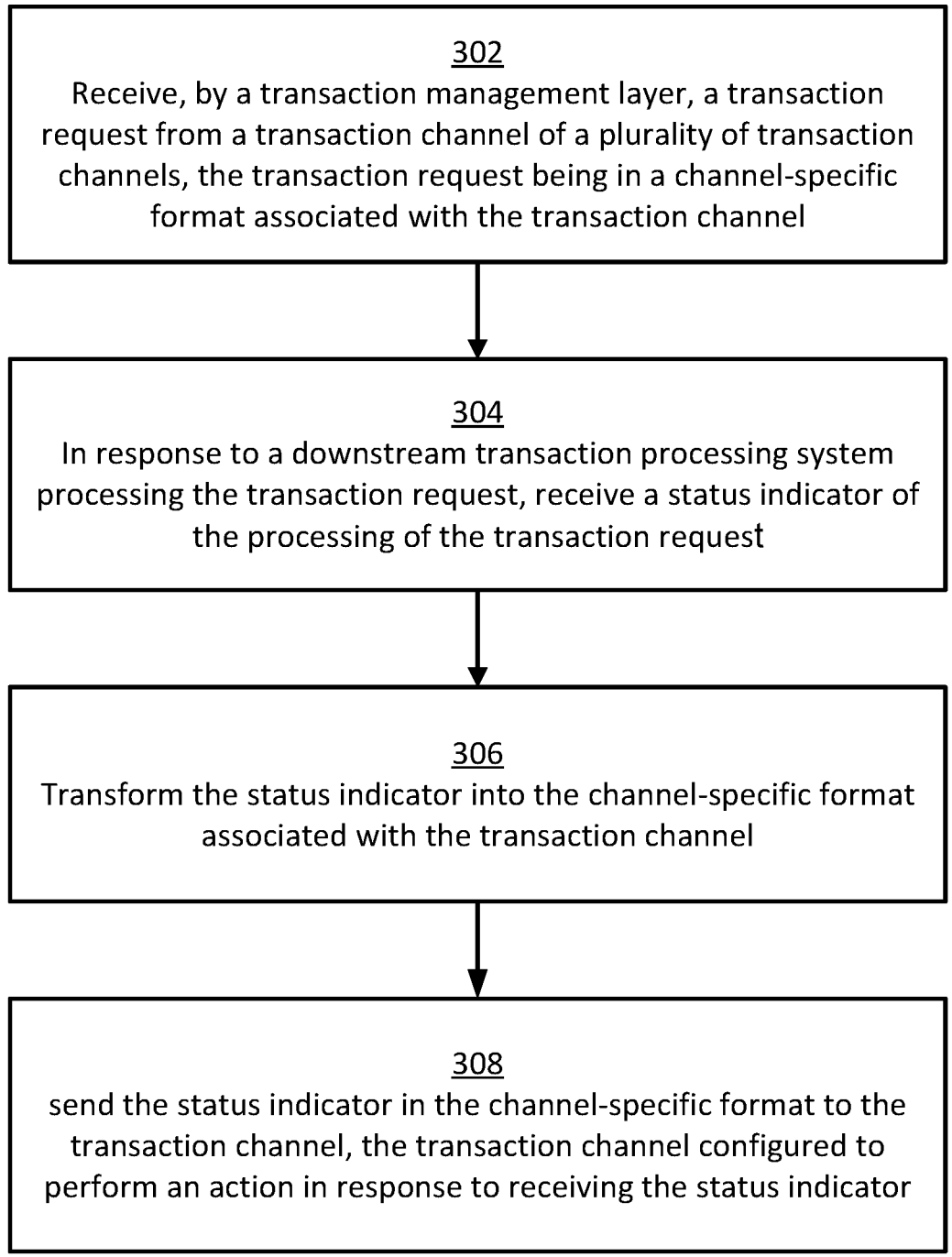
FIG. 3 is a flowchart of a process for implementing maintaining quality communication for integrated channels in a transaction system according to an example of the present disclosure.

FIG. 3 is a flowchart of a process for implementing maintaining quality communication for integrated channels in a transaction system according to an example of the present disclosure. The process of FIG. 3 can be implemented by the transaction management layer 102 of FIG. 1 or the system 200 of FIG. 2, but other implementations are also possible. While FIG. 3 depicts a certain sequence of steps for illustrative purposes, other examples can involve more steps, fewer steps, different steps, or a different order of the steps depicted in FIG. 3. The steps of FIG. 3 are described below with reference to the components of FIG. 2 described above.

At block 302, the processor 202 receives, by a transaction management layer 208, a transaction request 210 from a transaction channel 212 of a plurality of transaction channels 214. The transaction request 210 can be in a channel-specific format 216 associated with the transaction channel 212. For example, the processor 202 may receive the transaction request 210 as a CSV file.

At block 304, the processor 202, in response to a downstream transaction processing system 218 processing the transaction request 210, receives a status indicator 224 of the processing of the transaction request 210. The downstream transaction processing system 218 may determine a status specification of the transaction channel 212 and generate the status indicator 224 based on the status specification. For instance, the status specification may indicate that status indicators are to be sent to the transaction channel 212 in response to transaction requests over a certain amount. So, upon determining that the transaction request 210 is for an amount that is over the certain amount, the downstream transaction processing system 218 can generate the status indicator 224 in a transaction processing format of the downstream transaction processing system 218.

At block 306, the processor 202 transforms the status indicator 224 into the channel-specific format 216 associated with the transaction channel 212. The processor 202 can transform the status indicator 224 into an internal specific format of the transaction management layer 208 based on a first mapping from the transaction processing format to the internal specific format. The processor 202 can access a database that stores the first mapping to transform the status indicator 224 into the internal specific format. In some examples, the database may store a single first mapping that the processor 202 uses to transform each status indicator in the transaction processing format into the internal specific format.

The processor 202 can transform the status indicator 224 in the internal specific format into the channel-specific format 216 of the transaction channel 212. For example, the processor 202 can convert the status indicator 224 to the internal specific format by using a second mapping to transform the internal specific format into a CSV file. To determine the second mapping, the processor 202 can access the database storing a set of mappings between the internal specific format and a plurality of channel-specific formats for the transaction channels 214. The processor 202 may update the database, for example by storing a new channel-specific format corresponding to a new transaction channel being integrated in the system 200. Thus, the processor 202 may implement a relatively shorter response time to transform the status indicator 224 into the channel-specific format 216, thereby streamlining this transformation.

At block 308, the processor 202 sends the status indicator 224 in the channel-specific format 216 to the transaction channel 212. The transaction channel 212 can be configured to perform an action in response to receiving the status indicator 224. For example, if the status indicator 224 indicates a successful completion of the transaction request 210, the transaction channel 212 may initiate the sending of another transaction request.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
memory including instructions that are executable by the processor to cause the processor to:
receive, by a transaction management layer, a transaction request from a transaction channel of a plurality of transaction channels, the transaction request being in a channel-specific format associated with the transaction channel;
in response to a downstream transaction processing system processing the transaction request, receive a status indicator of the processing of the transaction request;
transform the status indicator into the channel-specific format associated with the transaction channel by:
receiving the status indicator from the downstream transaction processing system in a transaction processing format of the downstream transaction processing system;
transforming the status indicator into an internal specific format of the transaction management layer based on a first mapping from the transaction processing format to the internal specific format; and
transforming the status indicator into the channel-specific format of the transaction channel based on a second mapping from the internal specific format to the channel-specific format; and
send the status indicator in the channel-specific format to the transaction channel, the transaction channel configured to perform an action in response to receiving the status indicator.

2. The system of claim 1, wherein the memory further includes instructions that are executable by the processor for causing the processor to:
access the first mapping and the second mapping from a database storing the first mapping between the transaction processing format and the internal specific format and a set of mappings between a plurality of channel-specific formats for the plurality of transaction channels and the internal specific format, wherein the set of mappings includes the second mapping.

3. The system of claim 1, wherein the memory further includes instructions that are executable by the processor for causing the processor to:
prior to transforming the status indicator into the channel-specific format:
determining that the status indicator is associated with the transaction request from the transaction channel.

4. The system of claim 1, wherein the status indicator comprises an acknowledgement or a confirmation of an execution of the transaction request based on a specification of the transaction channel.

5. The system of claim 1, wherein the transaction request comprises a wire transfer request and the downstream transaction processing system comprises a wire transfer system.

6. The system of claim 1, wherein the channel-specific format comprises a comma-separated values file, a messaging queue message, or an extensible markup language file.

7. A non-transitory computer-readable medium comprising instructions that are executable by a processor for causing the processor to:
receive, by a transaction management layer, a transaction request from a transaction channel of a plurality of transaction channels, the transaction request being in a channel-specific format associated with the transaction channel;
in response to a downstream transaction processing system processing the transaction request, receive a status indicator of the processing of the transaction request;
transform the status indicator into the channel-specific format associated with the transaction channel by:
receiving the status indicator from the downstream transaction processing system in a transaction processing format of the downstream transaction processing system;

transforming the status indicator into an internal specific format of the transaction management layer based on a first mapping from the transaction processing format to the internal specific format; and transforming the status indicator into the channel-specific format of the transaction channel based on a second mapping from the internal specific format to the channel-specific format; and send the status indicator in the channel-specific format to the transaction channel, the transaction channel configured to perform an action in response to receiving the status indicator.

8. The non-transitory computer-readable medium of claim 7, further comprising instructions that are executable by the processor to cause the processor to:

access the first mapping and the second mapping from a database storing the first mapping between the transaction processing format and the internal specific format and a set of mappings between a plurality of channel-specific formats for the plurality of transaction channels and the internal specific format, wherein the set of mappings includes the second mapping.

9. The non-transitory computer-readable medium of claim 7, further comprising instructions that are executable by the processor to cause the processor to:

prior to transforming the status indicator into the channel-specific format:

determining that the status indicator is associated with the transaction request from the transaction channel.

10. The non-transitory computer-readable medium of claim 7, wherein the status indicator comprises an acknowledgement or a confirmation of an execution of the transaction request based on a specification of the transaction channel.

11. The non-transitory computer-readable medium of claim 7, wherein the transaction request comprises a wire transfer request and the downstream transaction processing system comprises a wire transfer system.

12. The non-transitory computer-readable medium of claim 7, wherein the channel-specific format comprises a comma-separated values file, a messaging queue message, or an extensible markup language file.

13. A method comprising:

receiving, by a transaction management layer, a transaction request from a transaction channel of a plurality of transaction channels, the transaction request being in a channel-specific format associated with the transaction channel;

in response to a downstream transaction processing system processing the transaction request, receiving a status indicator of the processing of the transaction request;

transforming the status indicator into the channel-specific format associated with the transaction channel by:

receiving the status indicator from the downstream transaction processing system in a transaction processing format of the downstream transaction processing system;

transforming the status indicator into an internal specific format of the transaction management layer based on a first mapping from the transaction processing format to the internal specific format; and transforming the status indicator into the channel-specific format of the transaction channel based on a second mapping from the internal specific format to the channel-specific format; and sending the status indicator in the channel-specific format to the transaction channel, the transaction channel configured to perform an action in response to receiving the status indicator.

14. The method of claim 13, further comprising:

accessing the first mapping and the second mapping from a database storing the first mapping between the transaction processing format and the internal specific format and a set of mappings between a plurality of channel-specific formats for the plurality of transaction channels and the internal specific format, wherein the set of mappings includes the second mapping.

15. The method of claim 13, further comprising:

prior to transforming the status indicator into the channel-specific format:

determining that the status indicator is associated with the transaction request from the transaction channel.

16. The method of claim 13, wherein the status indicator comprises an acknowledgement or a confirmation of an execution of the transaction request based on a specification of the transaction channel.

17. The method of claim 13, wherein the transaction request comprises a wire transfer request and the downstream transaction processing system comprises a wire transfer system.

* * * * *